United States Patent [19]

Lasson

[11] Patent Number: 4,919,812
[45] Date of Patent: Apr. 24, 1990

[54] CLARIFIER ASSEMBLY

[75] Inventor: Alan R. Lasson, Salt Lake City, Utah

[73] Assignee: Baker Hughes Incorporated, Houston, Tex.

[21] Appl. No.: 250,441

[22] Filed: Sep. 28, 1988

[51] Int. Cl.$^5$ .............................................. B01D 43/00
[52] U.S. Cl. .................................... 210/519; 210/522
[58] Field of Search ................ 29/163.8; 210/521, 522, 210/532.1, 802, 519

[56] References Cited

U.S. PATENT DOCUMENTS

| | | | |
|---|---|---|---|
| 3,919,084 | 11/1975 | Bebech | 210/519 |
| 3,951,818 | 4/1976 | Bosnjak | 210/522 |
| 4,508,256 | 4/1985 | Radel et al. | 29/163.8 |
| 4,544,487 | 10/1985 | Bosnjak | 210/522 |
| 4,747,196 | 5/1988 | Moir | 210/522 |
| 4,795,560 | 1/1989 | Chupka et al. | 29/163.8 |

Primary Examiner—Frank Spear
Assistant Examiner—Joseph Drodge
Attorney, Agent, or Firm—Trask, Britt & Rossa

[57] ABSTRACT

A clarifier constructed of a pair of spacedly positioned upright supports having a plurality of inverted "V"-shaped carrier chambers mounted to extend therebetween is disclosed. Each support defines a plurality of inverted "V"-shaped recess wells in the surface thereof along its height which individually receive an end of a respective carrier chamber. A detachable connection strip provides means of connecting adjacently positioned supports to form clarifiers of increasing height. Each support defines a plurality of apertures therein which communicate individually with a respective carrier chamber. A novel flow regulator strip arrangement provides means of sealedly controlling the effluent exiting each said aperture from a respective carrier chamber.

25 Claims, 9 Drawing Sheets

CLARIFIER ASSEMBLY

BACKGROUND OF THE INVENTION

1. Field

This invention relates to apparatus for separating a carrier fluid from solids suspended within that fluid. More particularly, the invention is directed to clarifier apparati used for slurry processing which utilize gravity to effectuate a liquid/solids separation.

2. State of the Art

Various clarifier systems for use in separating carrier fluids from suspended solids are known in the art. Such systems typically include a vessel having an inlet and an outlet. The inlet and outlet are positioned to establish a flow path for a stream of fluid mixture introduced into the vessel. A separation unit is oriented within that flow path to intercept the stream of mixture and separate the carrier fluid from the solids suspended within the fluid. The clarified carrier fluid is thereafter channeled off into one receiving area while the solids are directed to another.

U.S. Pat. No. 3,951,818 (Bosnjak) discloses a clarifier of the gravity separation type. This clarifier includes a vertical upright channel defined by a pair of oppositely positioned separation elements. Each of the separation elements includes a vertical plate which is interseted at spaced intervals along its height by outwardly extending flow directioning plates. The directioning plates intersect the vertical plate at an acute angle; i.e., the directioning plates are arranged at an angle to the horizontal plane.

The vertical plates each define a plurality of sized orifices, positioned proximate each intersection of the vertical plate with a flow directioning plate, more specifically, proximate an apex formed by that intersection. Each of the orifices communicates with the vertical channel thereby establishing a pathway from the body of the fluid mixture to the vertical channel.

The Bosnjak separation elements are suspended within a receiving vessel by two upright supports which are spacedly positioned one from another. The supports include a plurality of outwardly extending rods. An apex of each separation element is formed by the intersection of the vertical support with a directioning plate. This apex is placed over a respective support rod and thereafter is held in position by the action of the rod against the apex.

In operation, clarifiers of the kind typified by the Bosnjak structure have experienced difficulty in operation. Due to the structures of the clarifiers, the vertical plates are not held in a sealed relationship with upright supports. These upright supports form the sides of the plurality of compartments defined by the association of the vertical plate, directioning plates and supports. As a result of the unsealed relationship, short circuiting of the separation process occurs. Specifically, unclarified mixture may bypass the gravity separation action of the compartments by flowing around the vertical plates directly into the vertical channel. This short circuiting action results in the clarified carrier fluid within the vertical channel being contaminated by an infusion of the unclarified fluid mixture. This contamination imposes a practical limitation on the separation efficiency of the clarifier apparatus and, more specifically, on the concentration of clarified carrier fluid obtainable by use of the apparatus.

The requirement of a vertical channel makes clarifiers of the Bosnjak construction relatively spatially large. Considering that clarifiers may be installed in spatially restricted environments, such as in mines, the spatial requirements of this clarifier construction may prove disadvantageous.

U.S. Pat. No. 4,544,487 (Bosnjak) discloses a clarifier system composed of back-to-back positioned separation elements. Each element includes a vertical plate intersected at spaced intervals by outwardly extending flow directioning plates similar to those disclosed in U.S. Pat. No. 3,951,818. The vertical plate and flow directioning plates form a series of apexes similar to the construction described above. The latter structure differs from the former in that the apexes include a curved wall which substantially confines the area extant between each intersection of the vertical plate and a directioning plate thereby forming an open-ended horizontally oriented pipe. This horizontal pipe together with the channel defined thereby functionally substitutes for the vertical channel of the former construction as a means of withdrawing clarified carrier fluid from the clarifier.

While clarifier configurations of the type disclosed in U.S. Pat. No. 4,544,487 remedy the short circuiting complications of clarifiers, such clarifiers engender a different problem. Specifically, clarifiers are often subjected to severe loading induced stresses during their installation and use. Oftentimes, the carrier pipes and flow directioning plates have become separated from their supports either during installation or use.

In view of the disclosed clarifiers, there exists a need for a clarifier system which circumvents the possibility of the fluid mixture short circuiting the clarifier process, while at the same exhibits a sufficiently structural integrity to withstand the stresses encountered during installation and operation.

SUMMARY OF THE INVENTION

A clarifier constructed according to the instant invention includes a vessel having an inlet and outlet. The inlet and outlet are oriented to establish a flow path therebetween for a fluid mixture composed of a carrier fluid having solids suspended therein. Positioned and supported within the vessel, and oriented to intercept that flow path, is a separator. This separator includes an assembly constituted of a plurality of carrier chambers or conductors and a corresponding plurality of flow directioning members fixedly mounted to a pair of upright supports adapted to retain those carrier chambers and flow directioning members in a selected spatial relationship. A fluid conveyance means is associated with the separator for draining off clarified fluid.

More specifically, the separator includes a pair of spaced upright supports, which may be oriented substantially parallel to one another. Each support may be constituted of a plurality of interconnected support members.

A plurality of fluid conductors or carrier chambers are secured to each of the supports. The conductors or chambers may have a pipe-like appearance. Hereinafter, the term "pipes" shall be used in identifying the conductors or chambers, but it should be understood that any structure capable of conveying fluid and receiving fluid through a porous sidewall thereof is within the ambit of this invention. Each chamber extends from one support to the other. The chambers are preferably positioned one above another in a generally vertical stacked arrangement. Each of the chambers may have at least one orifice defined therein positioned along its length which communicates with a hollow interior channel defined within the chamber. Each chamber also includes at least one open end or port which communicates with the chamber's interior channel.

A flow directioning member having a "V" or "U"-shaped configuration is preferably associated with each of the fluid carrier chambers. Each flow directioning member may be inverted and positioned atop a respective carrier chamber to rest thereon. A flow directioning member may be positioned between each pair of adjacent chambers.

Preferably, each flow directioning member has an inverted "V" shape. The interior angle of the apex of the inverted "V"-shaped configuration forms a receiving well into which a respective fluid carrier chamber may be positioned. In some embodiments, each carrier chamber may actually be fixedly mounted to a respective flow directioning member positioned atop that carrier chamber.

In a preferred embodiment, the carrier chamber and a respective flow directioning member may be fabricated as a single integral assembly. In this construction, two first planar panels may be mounted one to another to form a generally inverted "V"-shaped structure. This structure defines an interior angle between the panels. A third panel may be mounted to each first planar panel to extend between those panels, thereby defining a generally triangular cross-sectioned carrier chamber which may extend along the length of the panels and functions as a fluid conveyance means. This third panel may be planar or curvalinear in configuration. At least one orifice, which communicates with the channel, is defined within the third panel. The first planar panels extend outwardly from the channel thereby forming flow directioning structures.

It should be understood that the orifices in the carrier chambers are arranged in those regions of the chambers that are not covered by the flow directioning members.

The carrier chambers and flow directioning member assembly (hereinafter "assembly") is fixedly mounted to the upright supports. One or more of the upright supports may be configured to include a plurality of recess wells defined within an exterior surface thereof. The recess wells are arranged along the height of the support. Each recess well is configured to correspond to the shape and dimensions of the end of a respective assembly is adapted to receive and retain therein the end of such an assembly. Each recess well is dimensioned to be sufficiently deep that a respective assembly may be inserted into the recess well a sufficient distance that a strong and sealed mounting of the assembly on the upright support may be formed on the interfacial surface area of the recess wall sidewalls and the assembly sidewalls. Whereas, previous clarifier constructions have at most abutted an end of a carrier tube assembly against an upright support, the instant invention calls for not only an abutment of the end of the assembly against the support, but furthermore, a portion of the sidewalls of the assembly are also abutted against portions of the support, thereby increasing the contact area on which a bonding of the two structures can be effected. Understandably, the strength of the total bonding of the two structures can be measurably increased due to the increased bonding area made available under the instant inventive construction. This bonding may be formed in a number of ways, e.g., adhesive bonding, fusion bonding, and mechanical bonding.

At least one of the upright supports defines a plurality of openings therein which extend along the height of the supports. These openings are spaced such that each opening registers wit the open end of a respective carrier chamber mounted on the support. The openings communicate with a clarified fluid receiving receptacle, and provide a passageway for the clarified fluid received within the carrier chamber to be drained from the carrier chamber outward through the support and thereafter to the receiving receptacle.

In some embodiments, the opening-defining support may be fitted with a flow regulation means for varying the flow of clarified fluid through the openings in the support. This flow regulation means may include an elongate strip having a plurality of apertures defined therein. The apertures are spacedly arranged along the length, i.e., height, of the strip; the spacing corresponds to the spacing of the openings in the support.

The opening-defining support includes a channel configured therein adapted to receive the strip, preferably in a slide-in, slide-out manner. The channel retains the strip in abutment against the support such that the apertures in the strip are held in registration with the openings in the support, thereby defining a clear passageway from each carrier chamber, through the support and the strip and thereafter into a clarified fluid receiving receptacle. In one embodiment, the channel is constructed of two "L"-shaped flanges which are mounted upstandingly and substantially parallel one another on the opening-defining support. The flanges, in conjunction with the support, define a slotted, rectangular cross-sectioned channel whose width and length approximate the width and length of the elongate strip. The strip is dimensioned to be slidable within the channel, preferably in a slide-in, slide-out manner.

The opening-defining support may be fitted with a plurality of upstanding extensions or bosses. Each of these extensions has an open-ended, conduit or tubular like appearance and defines a hollow channel which extends between the opposing open ends of the extension. Each extension is positioned such that its channel is positioned to register with a respective opening of the support. The extension is configured to circumscribe its respective support opening and extend into the strip receiving channel. Each extension is sealingly mounted to its support, whereby the channel of the extension sealingly communicates with a respective opening in the support. Upon the elongate strip being slid into the channel, the extensions are brought into abutment against the strip and in many instances actually bias the strip against the lip of the channel defining flanges. The extensions are preferably dimensioned to circumscribe the openings in the strip.

When the strip is installed in the channel and the apertures of the strip and the openings of the support are brought into alignment, the extensions form a conduit between the support openings and the strip apertures. Due to the dimensioning of the channel and the strip, the extensions bias the strip outwardly against the channel forming flanges, thereby creating a pressure fit of the strip against the extensions proximate the location of each aperture. The pressure fit may be constructed to substantially seal the extension against the strip, thereby precluding fluid flow between the interface of the strip and the extension. Since the extension circumscribes the support opening and is sealingly mounted to that opening, the invention provides a pressure-fit, substantially sealed conduit between the support openings and the strip apertures. The association of the support openings, extensions, and strip apertures forms a plurality of outflow conduits which connect the interiors of the carrier chambers with a clarified fluid receptacle located beyond the strip. The strip provides a means of altering the dimensions of each of the outflow conduits between the carrier chambers to the clarified fluid receptacle.

Recognizably, the user may wish to vary the effective size of the outflow conduits in order to control the quantity of clarification being accomplished at various heights over the height of the clarifier. The cross-sectional diameter of the various conduits can be adjusted to compensate for variances in hydrostatic pressure along the height of the clarifier by varying the dimensions of the strip openings.

Notwithstanding that this invention may require a fixed mounting of the carrier chambers and flow directioning members onto the supports, the embodiment obtains a modular construction capability by providing supports of relatively short height. Each support is adapted at one or more of its ends with a novel coupling means adapted for coupling with another support, thereby permitting the user to assemble a vertical stacked array of individual clarifier separators to achieve a desired clarifying capacity.

Each support may include a means adapted for use in securing that support to either a second support which is located above or below it, or preferably to both a support positioned above it and a second support positioned below it. This connection means may include one or more outwardly extending bosses positioned proximate one or both of ends of each support. An elongate connection strip is adapted for either detachable or fixed mounting between each pair of adjacent supports for linking each pair of the supports. Each connection strip includes a pair of recess wells therein, each recess well being dimensioned to slidably receive a respective boss member of one of the supports. Each recess well is dimensioned to provide an interference fit with its respective boss. With each recess well receiving a boss from a respective support, the connection strip forms a mechanical connecting bridge or link between adjoining supports.

The end or ends of each support may be fitted with a means of aligning a second support therewith for purposes of facilitating a secure union of the two supports. This alignment means may include a male outwardly protruding extension mounted on an end of the support. The extension includes a pair of laterally extending wing-like members mounted on opposing sides thereof. A second support, adapted to connect with the male extension-fitted support, defines a female recess well therein configured to receive the male extension. The recess well may also be configured to include female, laterally extending, wing-like recess wells configured and adapted to interrelate with the wing-like members mounted on the male protruding extension. The interaction of the male extension and female recess wall provides a means of longitudinally and laterally aligning the two supports, i.e., in a two-dimensional plane. The interaction of the wing-like members is adapted to align the widths, i.e. a third dimensional alignment, of the two supports. The wing-like members and corresponding wing-like recess wells also hinder, if not preclude rotation of the supports about a longitudinal, i.e. vertical, axis during the process of connecting the two supports. Furthermore, the interaction of the lateral wings resists a disruption of the established union of the two supports directed about a vertical axis when the supports are in their final assembled orientation.

The association of the carrier chambers, upright supports and flow directioning members forms a plurality of open-sided compartments. Each compartment is defined by a top and bottom formed by the surfaces of adjacently positioned flow directioning members. An exterior surface of the carrier chamber may define a back wall of the compartment. In some embodiments, a vertical extension of the flow directing member may in part form this backwall. The sidewalls of the compartment are formed by the portions of the upright supports which extend between the described flow directioning members. The front of the compartment remains open, thereby permitting the introduction of fluid mixture into the compartment.

The fluid mixture is driven into each compartment by the effects of hydrostatic pressure operating on the mixture. Due to the angulated orientation of the flow directioning members, fluid mixture entering the compartment is driven upwards. Since the fluid is driven at a relatively low velocity and typically under laminar flow conditions, solids suspended within the mixture begin to settle out of the mixture due to the effects of gravity. As the mixture progresses through the compartment, the concentration of solids within the mixture decreases.

Upon the mixture reaching the carrier chamber which forms, or alternatively is positioned proximate, the back wall of the compartment, the mixture is substantially composed solely of carrier fluid, i.e., little if any solids remain within the mixture. At this juncture, the carrier fluid enters the orifices and is channeled through the chamber interior channel, outward through the support openings, the support mounted extensions, and strip apertures to receiving means positioned proximate the upright supports. The solids, which settle to the bottom of the compartment, are drained from the compartment through its open front and eventually are drained from the vessel.

The invention extends to a clarifier which has at least one separator, and furthermore, to clarifiers having a stacked (preferably vertical) array of separators in accordance with the invention.

The invention provides for modular-type clarifier separators which may be assembled one atop another to form a stacked array. The number of clarifier units may be adjusted to form a clarifier of desired dimensions. The modular clarifier units are dimensioned to be easily transportable, and furthermore, each clarifier separator may include means for connection to other clarifier separators.

BRIEF DESCRIPTION OF THE DRAWINGS

The invention is now described by way of an example, with reference to the accompanying drawings, in which.

DESCRIPTION OF THE ILLUSTRATED EMBODIMENT

Figure 1:
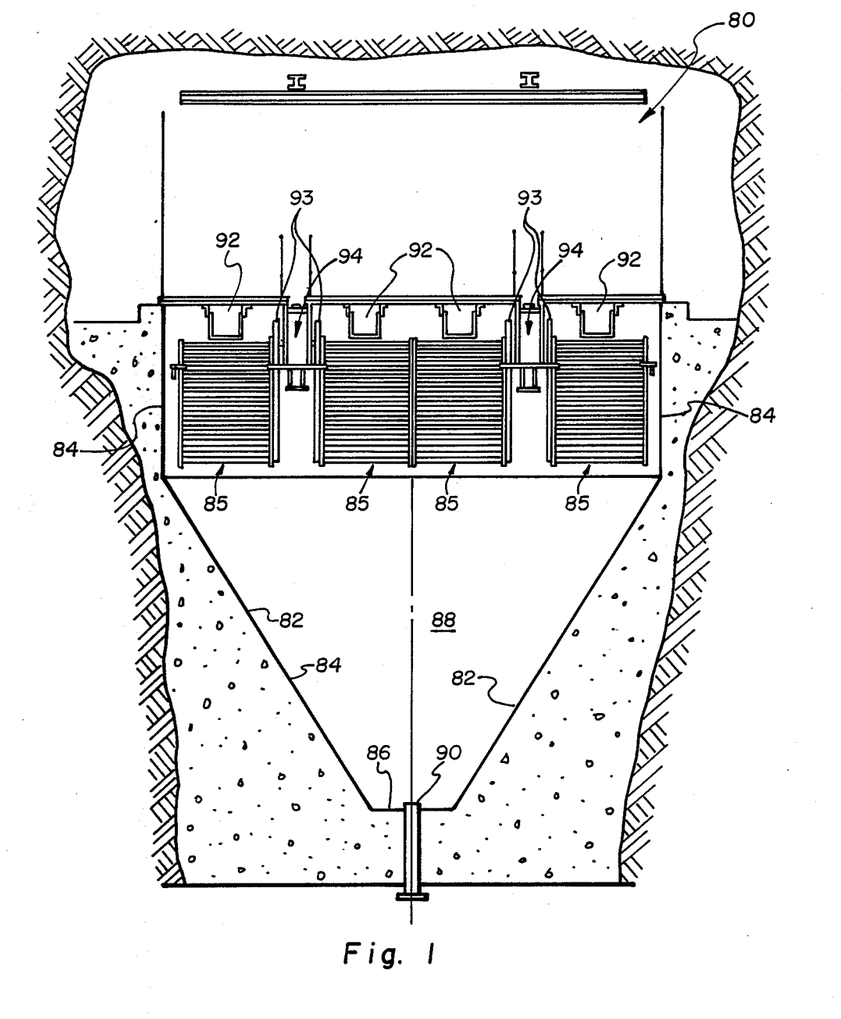
FIG. 1 shows a schematic view of a clarifier in accordance with the invention, which is located underground in a mine.

Referring to FIG. 1, a clarifier for use in clarifying water in a mine is designated generally by reference numeral 80. Clarifier 80 includes a vessel 82 defined by a plurality of upstanding walls 84 and a bottom 86. The association of walls 84 and bottom 86 constitutes a receptacle suited for retaining a fluid mixture, generally 88. Vessel 82 includes a drain 90 positioned within the bottom 86.

The clarifier 80 has four stacks of separators 85, through which clear water passes. Water to be clarified is supplied via feed launders 92. Clear water passes into the stacks and exits via risers 93 and discharge launders 94.

Figure 2:
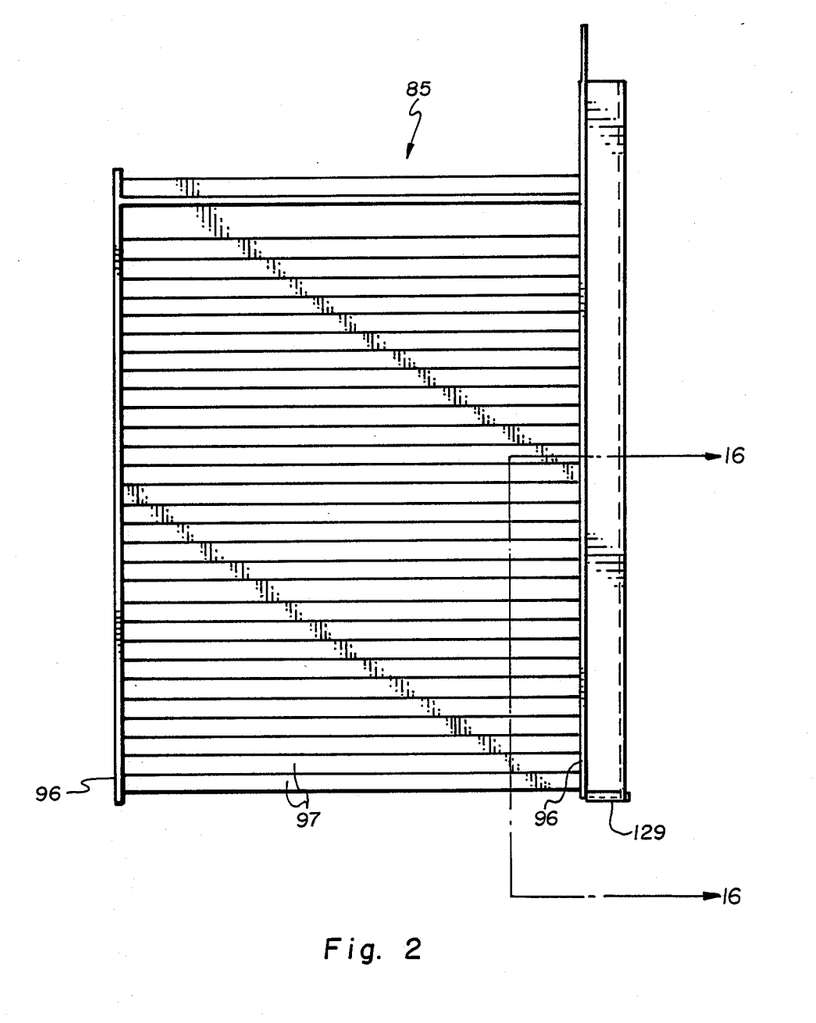
FIG. 2 shows a schematic side view of one of the separation units forming part of the clarifier of FIG. 1.

Referring now to FIG. 2, the stack 85 of separators 95 is shown in more detail. The stack is formed primarily from two upright vertical supports 96 and a number of integral chambers and inverted "V"-shaped flow directioning assemblies 97. The uprights supports 96 may be injection molded from a suitable synthetic material. The assemblies 97 may be extruded of a suitable synthetic material, e.g. plastic.

The physics operable in the separation process effected by the instant apparatus is described in U.S. Pat. No. 4,544,487 (Bosnjak), cols. 7 and 8, which description is hereby incorporated herein by reference.

The association of the chamber and flow directioning assemblies 97 and upright supports 96 defines a plurality of vertically disposed, open-sided compartments 98. In use, the compartments are positioned adjacent a flow stream indicated by arrow 99 of mixture 88, thereby facilitating an introduction of that mixture into the various compartments through an open side or ingress thereof.

As the fluid mixture enters each compartment 98, the mixture is directed by hydrostatic pressure upward (indicated by arrow 100) toward orifices 101 defined in the sidewalls of the assemblies 97. Due to the relatively low velocity of the mixture, differences in densities between the carrier fluid and solids suspended therein and the structure of the compartments 98, the force of gravity effects a separation of the carrier fluid from the solids. Specifically, the solids typically settle out of the fluid mixture before the fluid mixture reaches the orifices 101. In contrast, the carrier fluid typically reaches the orifices and is withdrawn from the compartment through a channel defined in the assembly 97.

Figure 3:
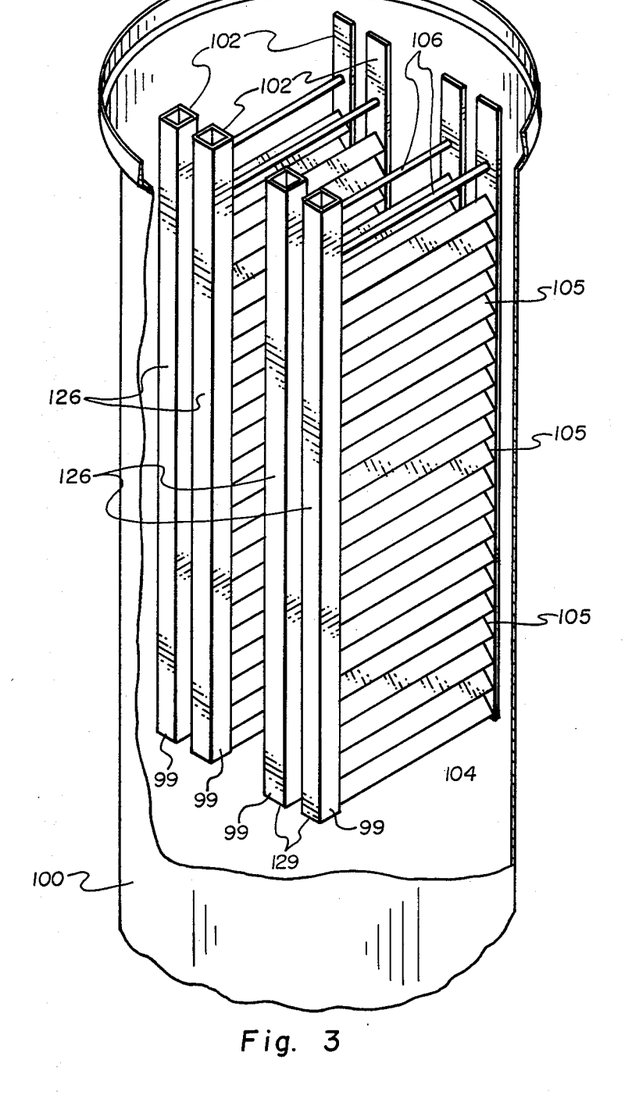
FIG. 3 is a perspective view of a clarifier of this invention having a plurality of clarifier separators positioned within a containment vessel or tank.

A preferred embodiment of the individual separator structure, generally 95, is illustrated in FIGS. 3 through 15. In FIG. 3, four separate clarifier separators of this construction are shown positioned within a generally cylindrical slurry containment vessel 82A. Each clarifier separator 95 is constructed of a pair of elongate upright supports 96A arranged parallel to another. Each of the supports 96A is constructed from a plurality of individual elongate support members 105. A plurality of flow directioning members 104, each having a generally inverted "V"-shaped configuration, are physically mounted to each pair of oppositely positioned support members 105, to extend therebetween. A bar-like member 106 is mounted to each support 96A to extend between those supports. Member 106 forms a lifting rod to which a user may connect a hoist or crane cable for purposes of lifting the clarifier separator either into or out of the containment vessel 82A. As shown, bar-like member 106 may be a cylindrical rod formed of metal or synthetic material, which is physically mounted to each support 102 by any conventional mounting means, e.g., adhesives.

Figures 4, 5:
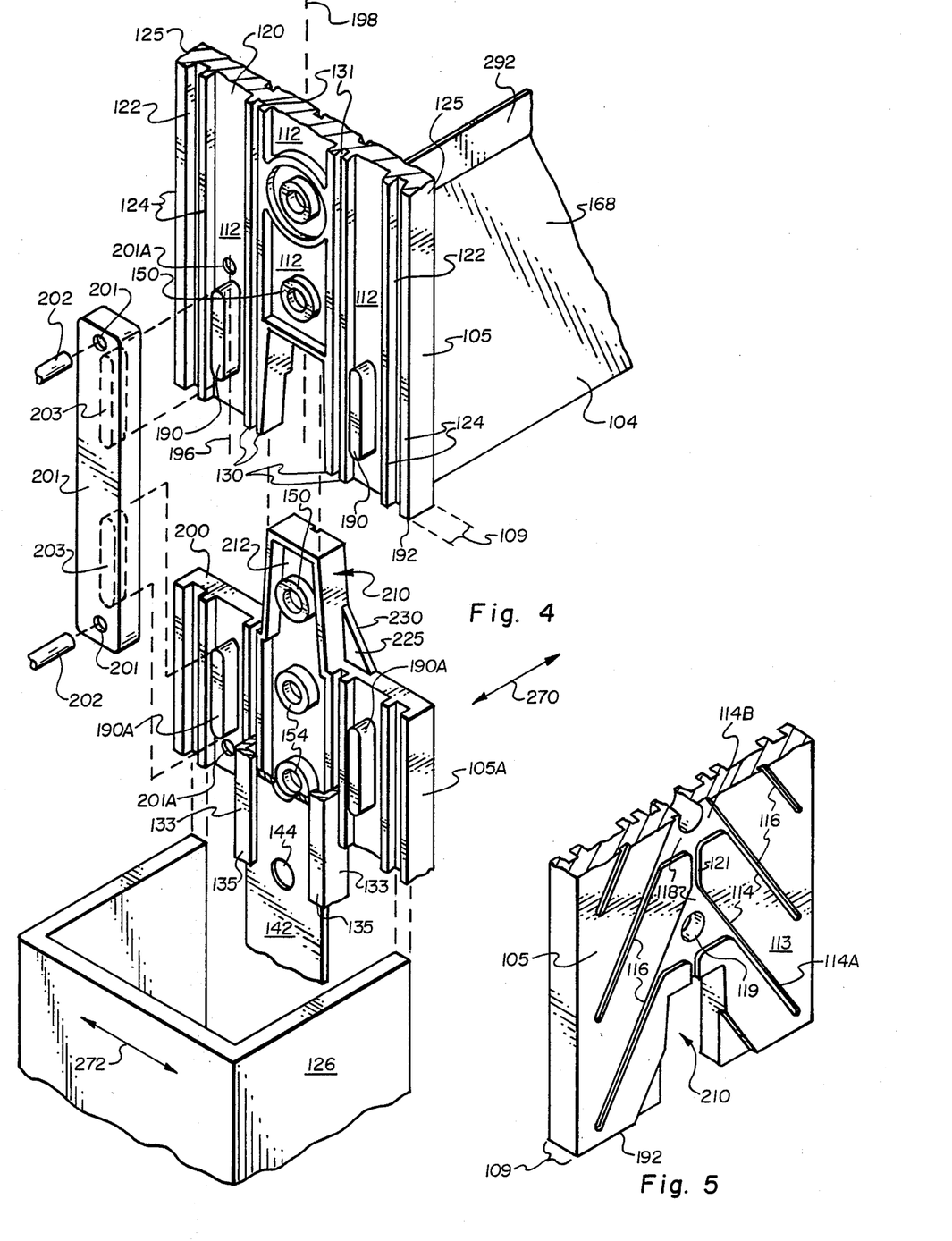
FIG. 4 is an exploded view of two clarifier vertical supports and a connection means used to link the supports.
FIG. 5 is a sectional view of a clarifier vertical support detailing the inverted "V" recess wells defined within the exterior surface thereof.

FIGS. 4 and 5 illustrate the opposing ends of two individual support members 105. Each member 105 is formed from an elongate solid planar panel having a generally rectangular shape in plan view. The thickness of the support member 105 is substantially constant over the length (height) of the member. The configuration of the member 105 lends it to being fabricated by injection molding, as opposed to extrusion, using synthetic materials, e.g., plastics or PVC.

As shown to advantage in FIG. 4, the inner facing exterior surface 113 of support member 105 defines a plurality of generally inverted "V"-shaped recess wells 114. Each recess well 114 includes a pair of elongate wing-like sections 116 which extend outwardly from a generally triangularly shaped central well region 118. In a preferred construction, the recess wall 114 has a constant depth of approximately two millimeters over its area. This depth may be varied. An aperture 119 is defined within the central well region 118 and extends through the complete thickness 109 of the support 105. A linear, elongate well section 121 extends from the triangular well portion 118 and connects with the recess well 114B positioned above recess well 114A.

Figure 6:
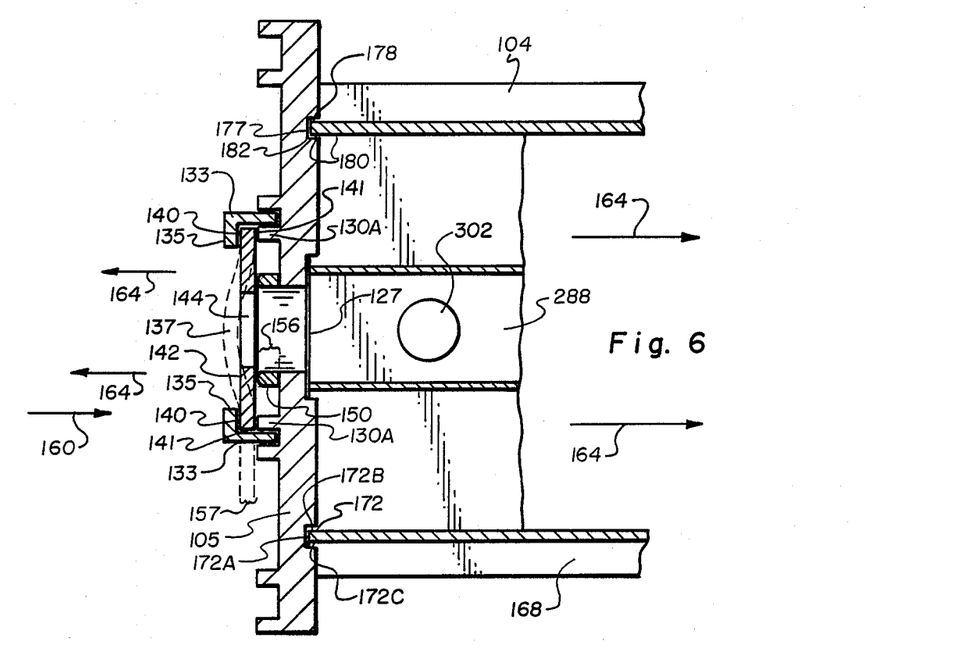
FIG. 6 is a top plan sectional view of a clarifier vertical support and a carrier chamber/flow-directioning assembly, the assembly is shown in cut away section revealing an orifice within the carrier chamber sidewall, other orifices within the carrier chamber sidewall are shown in phantom.
Figure 17:
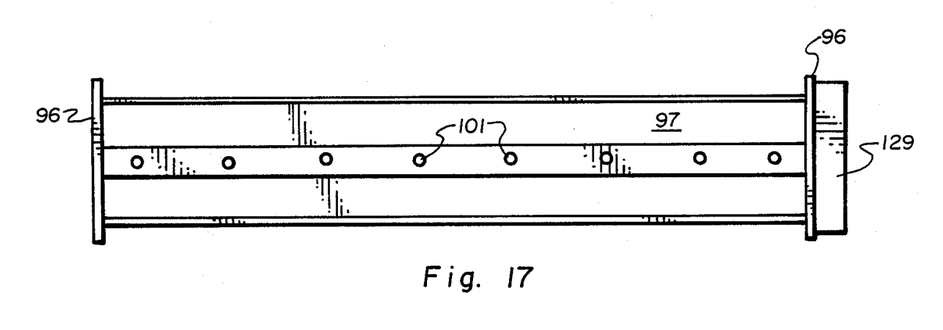
FIG. 17 is a bottom view of the separator shown in FIG. 2.

FIGS. 4 and 6 illustrate the outer facing exterior surface 120 of support 105. As shown, the support member 105 defines two channels 122 which extend along the complete height of the support. Each channel 122 is formed by two outwardly extending elongate extensions 124 which extend along the height of support member 105, parallel to one another. Each pair of extensions 124 is positioned proximate a side 125 of a support member 105. The channel 122 formed between the extensions 124 is dimensioned to receive the respective end of a generally "U"-shaped elongate receptacle forming cover structure 126. As shown in FIGS. 4 and 17, the structure 126 has two ends or sides 128 which are individually received into channels 122. The structure 126 is mounted with a floor 129 positioned near its lower region. The structure 126 in association with the support member 105 and a planar bottom 129 defines an open-topped, solid-side-walled, box-like structure which is adapted to receive and retain clarified fluid which flow into the structure through the openings 127 in support member 105.

The surface 112 also defines a second pair of channels designated generally 131. Similar to channels 122, the channels 131 are each formed by a pair of elongate extensions 130 which are positioned parallel to one another and which extend along the height of the support member 105. The channels 131 are positioned proximate the openings 127 within support member 105. Fitted within each channel 131 is a "L"-shaped flange 133. The flanges 133 may be manufactured from synthetic materials, e.g., plastic, preferably by injection molding or alternatively, an extrusion process. The flanges 133 are installed in their respective channels 131 with the lip portions 135 of the two flanges facing one another. The flanges 133 in association with the support 105 define an open sided, generally quadrilaterally cross-sectioned slide passageway or channel 137.

The flanges 133 may be fixedly mounted within their respective channels 131 by adhesive or other bonding means. The provision of flanges 133 and the slot channels 131 to retain them allow the manufacturer during manufacture to control the height of the inner surface flange above the support outer facing surface 112 over the entire length of the support member 105 by controlling the depth of insertion of each flange 133 into its respective channel 131.

In extrusion formed supports such as those exemplified by the supports shown in U.S. Pat. No. 4,747,196, the nature of the extrusion process tends to produce supports which are less than straight or linear along the entire length of the support. This problem is exacerbated in forming supports of considerable length. Inconsistencies in cooling of the fabricated support often produce ripples, warpage and other surface and structural irregularities.

Figure 12:
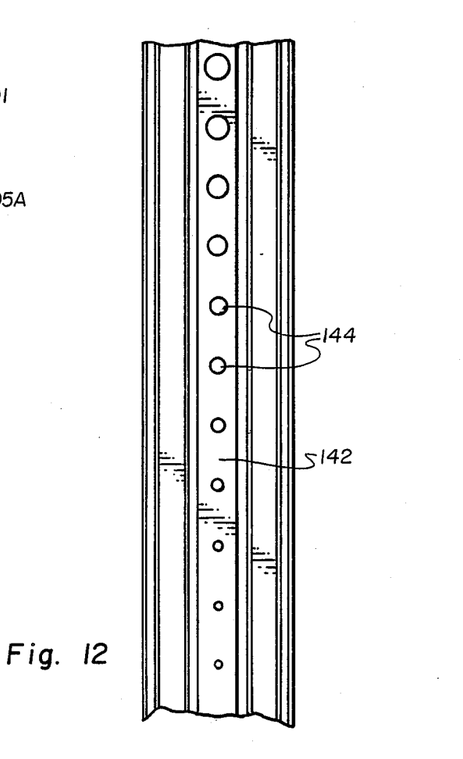
FIG. 12 is a sectional elevation view of a strip having apertures defined therein mounted within the flange-formed slotted channel of a vertical clarifier support.
Figure 13:
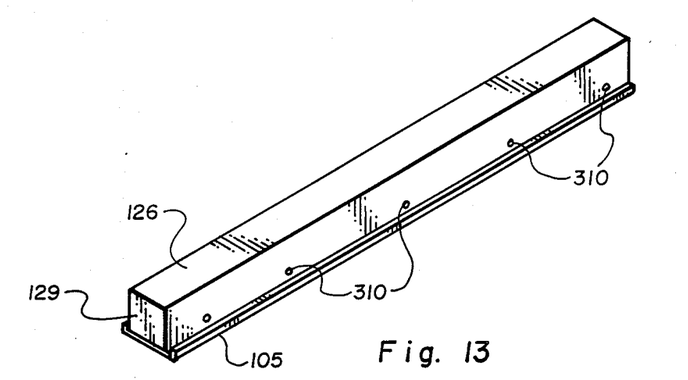
FIG. 13 is a sectional view of a clarifier support showing a receptacle forming cover mounted on that plate.
Figure 14:
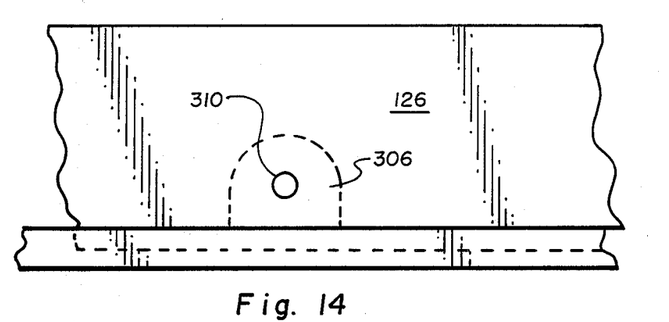
FIG. 14 is a sectional side view of the support cover arrangement shown in FIG. 13.

Using the present flange structure 133, the manufacturer can assure that the distance between the inner surface 140 of the lip 135 and the outer surface 112 of the support 105 is maintained consistent over the entire length of the support. The maintenance of the described distance is important in that the channel 137 is designed to receive a regulatory strip 142 and retain that strip in a liquid sealed relationship with the support surface 112. Strip 142 is an elongate rectangular shaped member having a constant thickness over its length. The strip is adapted to regulate the flow of clarified liquid from the carrier chambers of assembly 97 to the clarified fluid receptacle formed by cover structure 126. To properly effect this regulation, it is prerequisite that apertures 144 defined within the strip 142 be held in register with the openings 127 defined within the support member 105. Furthermore, the strip must be sealingly mated with the support surface 112 proximate the openings 127 whereby fluid passing through any specific opening 127 must needs be directed through the strip aperture 144 associated with that opening 127 without bypassing the aperture 144 and flowing around the strip 142. Stated otherwise, in order for the strip 142 to provide an efficacious regulatory means, it must be held substantially sealed against the support surface 112 proximate each opening 127 such that clarified fluid can only flow through the opening 127 and thereafter directly only through the associated strip aperture 144.

To effect this seal, the instant invention includes a plurality of solid annular extension 150 on support surface 112 which extend outward from support surface 112 into channel 137 and sealingly circumscribe the opening 127 in the support member 105. As shown, this extension 150 is configured to be a generally solid-walled, annular or tubular member which defines a hollow open-ended channel which extends throughout the length thereof. Extension 150 is sealingly mounted to the surface 112. In extending outward from the surface 112 of support member 105, the extension 150 actually forms a solid wall sealed conduit between the opening 127 in support member 105 and the open end 154 of the extension. The support member 105 in association with each extension 150 actually defines a solid-walled conduit 152 which extends from the inner surface 113 of the support 105 to the end 154 of the extension 150. The height 156 of the extension 150 is dimensioned such that it, together with the width 157 of the strip, substantially equals if not exceeds the distance 158 between the inner lip surface 140 of the flange 133 and extensions 141 of the outer surface 112 of the support member 105, which contacts and abuts the edges of the strip 142.

As illustrated in FIG. 6, the inner extensions 130A which in part form the channel 131 also may serve as a vertical abutment or shelf which stabilizes the strip 142 within the channel 131. Extensions 130A are elongate outward projecting members which extend along the height of support member 105. Each extension 130A in association with a respective flange 133 forms an elongate subchannel 159 within channel 131 which slidingly receives a respective edge 162 of the strip 142 and retains that edge 162 against displacement toward or away from support member 105.

Referring to FIG. 6, due to its height the extension 150 tends to exert an outwardly directed force (in the direction indicated by arrow 164) on strip 142. The inner surfaces 140 of lips 135 exert a reaction force on the edges 162 of the strips 142 in the direction denoted by arrow 160. In total, the lips 135 and extensions 150 tend to force the strip 142 into a somewhat arcuate-shaped, i.e. outwardly bowed or convex configuration, as shown in phantom. The strip 142 is typically fabricated of a material having resilient properties, e.g., synthetic materials such as plastic. The resistive nature of the strip 142 together with the action of the flange lips 135 and the extensions 150 on the strip 142 tends to force the strip 142 into a forced, pressure seal abutment with the extensions 150, thereby effecting a fluid-tight seal of the strip 142 with the extensions 150.

Recognizably, a variance in the dimensioning of the strips 142, the flanges 133 or the extensions 150 can lessen or increase the amount of pressure applied to the strip 142 by extensions 150, e.g., increasing the height 156 tends to increase the pressure, while reducing the height 156 would diminish the pressure.

Figure 10:
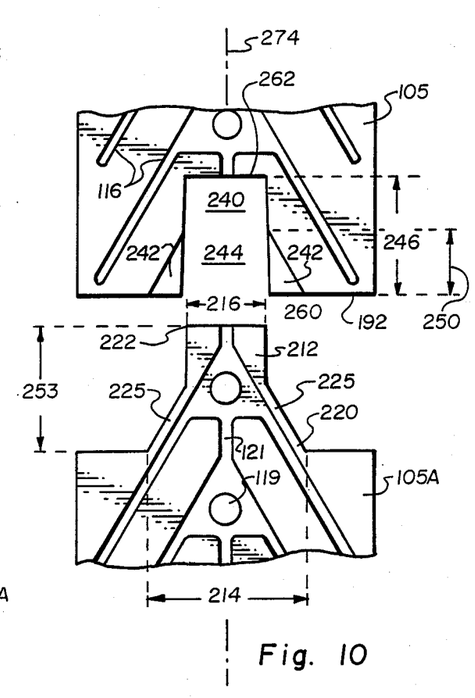
FIG. 10 is a plan view of the upper and lower ends of two supports illustrating the aforesaid alignment means.

The strip 142 as shown in FIG. 10 illustrates the apertures 144 as being varied, i.e., graduated, in size. More particularly, the apertures 144 are shown as decreasing dimensionally from the top towards the bottom of the strip 142. The dimensioning of the apertures 144 in the strip 142 shown in FIG. 10 may be determined by hydrostatic pressure differences which occur over the depth of tank 82A in which the clarifier separator is to be used. A single strip 142 having a height or length corresponding to the entire height of the support 102 may be used in clarifiers composed of multiple supports 105. For example, in the clarifier shown in FIG. 3, the clarifier array is formed of three separate support members 105 assembled one atop another to form the support 102. In this array, a single strip 142 having a length approximately that equal to the combined length of the three support members 105 may be used.

The inverted "V"-shaped recess wells 114 shown in FIGS. 5 and 6 are utilized to facilitate a strong and secure mounting of the assembly 168 on a support member 105. The recess wells 114 are configured to correspond to the end profile of the assembly 168. Upon an insertion of an end 170 of an assembly 168 into a corresponding recess well 114, the manufacturer is provided a minimum of three interfacial surface areas 172 upon which to bond the assembly 168 to the support 105. As shown to advantage in FIG. 6, a first interfacial surface 172A is constituted by the end 170 of the assembly 168 and the bottom of recess well 114. A second interfacial surface 172B is constituted by a side 178 of the flow directing member 104 and the sidewall 179 of recess well 114. A third interfacial surface 172C is constituted by an opposing side 180 of the flow directioning member 104 and the opposing sidewall 182 of recess well 114. The ends 174 of the flow directioning members 104 and the ends 186 of the recess wells 114 provide a fourth interfacial surface 172D. The width of the recess wells 114 is dimensioned to correspond to that of the assembly 97 whereby the sidewalls of that assembly are abutted against the recess wells 114, sidewalls and bottom when the assembly is inserted in the recess well 114.

The assembly 168 can be mounted to the support member 105 in a number of different ways. In a preferred embodiment, the assembly is bonded to support member 105, for example, by adhesives which are applied along the interfacial surfaces 172. An alternative construction may include a fusion bonding produced by a solvent-type adhesive applied along interfacial surfaces 172 which is compatible with the material composing the assembly 168 and support member 105.

Two or more clarifier separators may be assembled one atop another to form a combination clarifier separator having any desired height. For example, the clarifier separator shown in FIG. 3 is illustrated as being composed of three separate clarifiers, one positioned atop another. In forming the combination clarifier separator, each of the support members 105 of each clarifier separator is fitted with a means of connecting that support member 105 to the support member 105 of a clarifier separator positioned either directly above or below it. In FIG. 4, this connection means is shown as including a pair of outwardly extending bosses 190 which are positioned on the outer exterior surface 112 of support member 105 proximate the bottom 192 of that support member 105. The bosses 190 may be outwardly extending elongate members which are positioned to have their respective longitudinal axes 196 oriented parallel to the longitudinal axis 198 of the support member 105. The bosses 190 are oriented parallel and spacedly from one another. The bosses 190 are positioned to intercooperate with a similar pair of bosses 190A which are positioned proximate the top region of a support member 105A positioned below support member 105. The intercooperation of a pair of bosses 190 consisting of one boss from each support member 150 is facilitated by an elongate connection strip 201. Each strip 201 defines a recess well 203 at each of its opposing ends which is dimensioned to correspond to and register with a respective boss 190 on one of the supports 150. The connection strip 201 is fabricated from a resilient material, such that each boss 190 and its respective recess well 203 cooperate to form a manually detachable interference fit, i.e., the recess well 203 expands somewhat to receive the boss 190 but as the boss is fully inserted into the recess well 203, the recess well 203 contracts about the boss 190 in a clamping action which secures the boss 190 in place, i.e. a snap-on, snap-off fitting. As shown, preferably each pair o adjacent support members 150 are connected by a pair of parallelly positioned connection strips 201. The connection strips 201 function to link one boss 190 of the superiorly positioned support member 105 with a boss 190A of the inferiorly positioned support member 105A. The connection strip 201 and its accompanying recess wells 203 are dimensioned and configured so as to retain the supports 105 and 105A in the relationship illustrated in FIG. 11 upon the connection strips 201 being installed. Preferably, the bottom end 192 of support 105 and the top region 200 of support 150A are held in abutment one against the other by the connection strips 201 to form a firm union.

Figure 11:
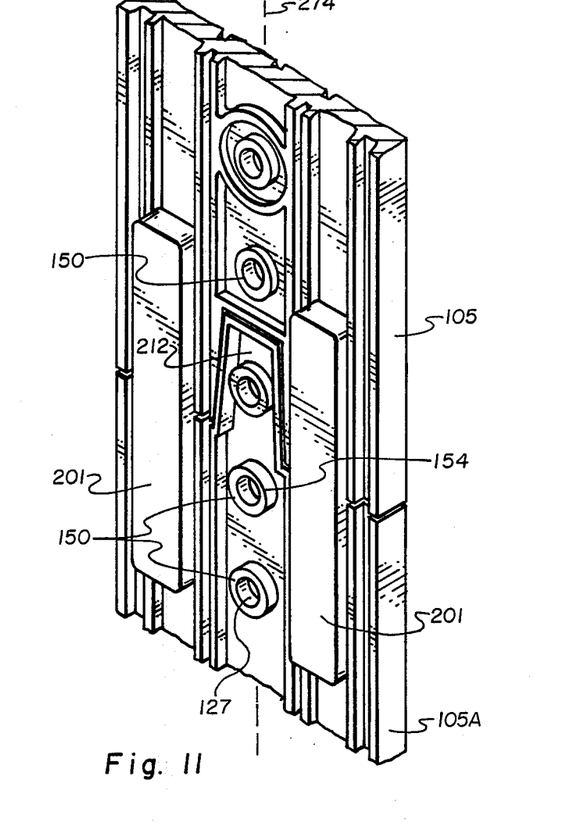
FIG. 11 is an elevated perspective view of two vertical clarifier supports connected together by a pair of connection strips.

Recognizably, the respective locations of the bosses 190 and the recess wells 203 may be reversed, i.e., the support members 105 and 105A may be configured to define recess wells 203 and the bosses 190 may be mounted on the connection strips 201. The ability and structural integrity of the connection strips 201 may be enhanced by the insertion of dowels 202 through openings 204 in the strips 201 and into corresponding openings 204A in the members 105. The dowels 202 may be adhesively bonded or otherwise bonded to their respective strips 201 and members 105.

FIGS. 4, 5, and 10 illustrate an alignment means which may be used to align a superiorly positioned support member 105 and an inferiorly positioned support member 105A for purposes of joining them together. As shown, the inferior support 105A includes a tongue-like extension member 212 mounted on the top end 200 of the support. The tongue 212 has a base width 214 which is wider than its top width 216, i.e., the tongue 212 tapers from its base 220 to its top 222. In profile, the tongue has the appearance of a truncated isosceles triangle. Mounted on either side of the tongue 212 is a wing-like, laterally extending member 225. As shown in FIG. 10, each wing-like member has a generally right triangular profile in plan view. The wing-like members 225 each have a thickness 230 which is less than the thickness 232 of the tongue member 212.

The bottom 192 of each support 105 defines a recess slot or well 240 which is dimensioned to correspond to the tongue member 212. As shown, the recess slot 240 passes through the entire thickness of the support member 105. The recess slot 240 is configured to have a pair of triangular shaped recesses 242 positioned one opposite another about the central tongue-shaped recess slot 240. Recesses 242 are configured and dimensioned to correspond to and receive the wing-like members 225. The thickness, i.e. depth 246 of the recess slot 240 is greater than the depth 250 of the triangular shaped recess slots 242.

The depth 246 of the recess slot 240 is dimensioned to slightly exceed the height of the tongue member 212 designated generally as 253. This dimensioning permits the tongue 212 to be completely inserted into recess slot 240 without the end 260 of that tongue 212 contacting the end 262 of the recess slot 240. Upon the tongue 212 being inserted into the slot 240 the narrowing width of the slot 240 forces the tongue 212 into a selected orientation and location. As the tongue's 212 insertion into slot 240 continues, the tongue 212 is guided by the narrowing recess slot 240 until it eventually aligns its support member 150A with the recess well fitted support member 150 within the slot 240 to facilitate the attachment of the connection strips 201. The wing-like members 225 also interact with the triangular-shaped recesses 242 in guiding the tongue 212 into its desired positioning. The wing-like members 225 in association with their respective recess slots 242 operate to primarily align the movement of the supports 105 and 105A in the directions indicated by arrow 270, while the tongue member 212 functions primarily to align the supports in the directions indicated by arrows 272 and 273.

When the supports 105 and 105A are connected together, the wing-like members 225 also function to hinder if not preclude any rotation of the support 105 vis-a-vis support 105A about a vertical axis 274 of the connected supports. Any such rotation brings one of the wing-like members 225 into abutment against the shelf-like floor 276 of the triangular shaped recess well 242. This abutment together with the resistance produced by the two connection strips 201 hinder, if not preclude, any of the described rotation.

Figure 7:
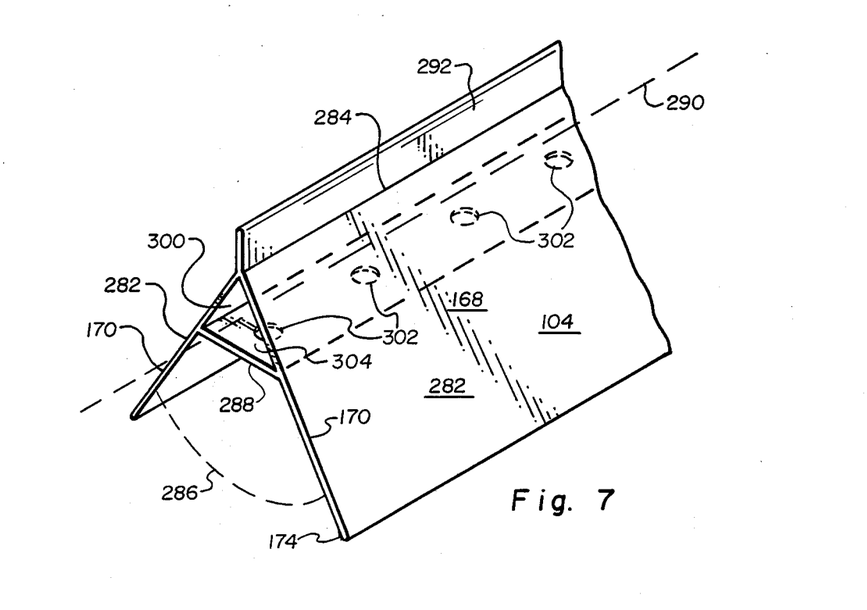
FIG. 7 is a perspective, sectional view of an embodiment of a carrier chamber/flow directioning member of the invention.

FIG. 7 illustrates a combination carrier chamber/flow directioning member assembly 168 of this invention. The assembly 168 includes a pair of planar panels 282, which each have a generally rectangular appearance in plan view. The panels 282 are conjoined one to another along a side 284 of each panel to form a generally angulated construction which defines an interior angle 286. A third planar panel 288 which also has a generally rectangular appearance in plan view, but is significantly smaller dimensionally in comparison to panels 282, is mounted on the conjoined pair of panels 282. The panel 288 is oriented parallel to longitudinal axis 290 of assembly 280.

A fourth planar panel 292 is mounted to the conjunction of sides 284 of the panels 282. Panel 292 extends along the length of panels 282. Panel 292 is dimensioned to be received within the recess slot 121 defined in the support 105. In the assembled separator, the panel 292 of an assembly 168 abuts against the panel 288 of an assembly 168 positioned immediately above it. Panel 292 functions as a support for the assembly 168 positioned above it and lends structural integrity to the separator structure. As shown, panel 292 extends along the complete length of the assembly 168.

The association of the panels 282 and panel 288 defines a triangular cross-sectioned channel or carrier chamber 300 which extends along the complete length of the assembly 168.

Figure 8:
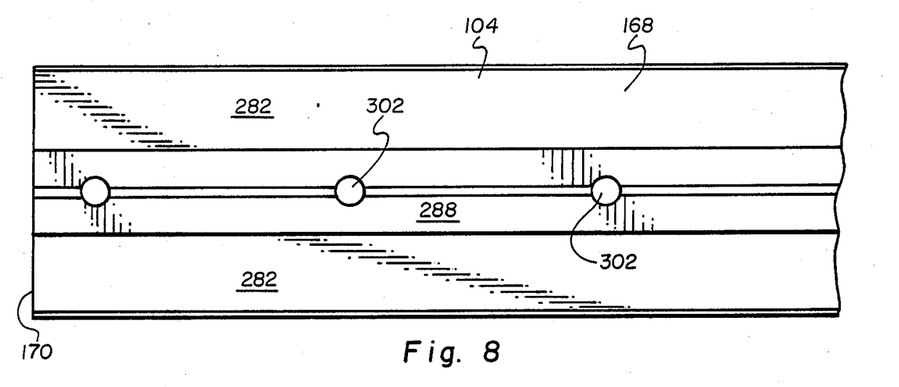
FIG. 8 is a bottom view of a carrier chamber/flow directioning member assembly illustrating the orifices within the carrier chamber sidewall.
Figure 9:
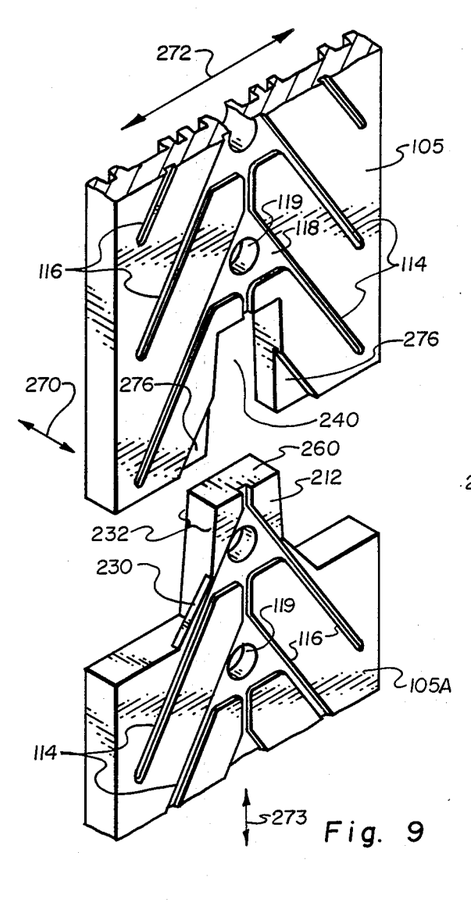
FIG. 9 is an elevated perspective view of a pair of supports illustrating details of the means provided for aligning the two supports together prior to their connection one with another.

The panel 288 defines a plurality of orifices 302 therein which extend through the entire thickness of the panel 288. These orifices 302 provide a means of communicating the environment with the interior 304 of each carrier chamber 300. FIG. 8 is a view from below an assembly 168 illustrating the panel 288 together with the openings 302 arranged along the length of that panel 288.

Figure 15:
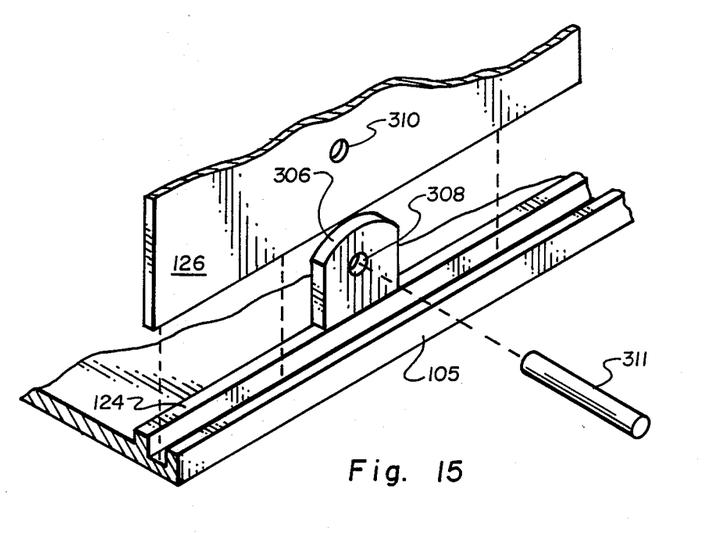
FIG. 15 is an exploded sectional perspective view of a clarifier support illustrating a retaining bracket mounted thereon.
Figure 16:
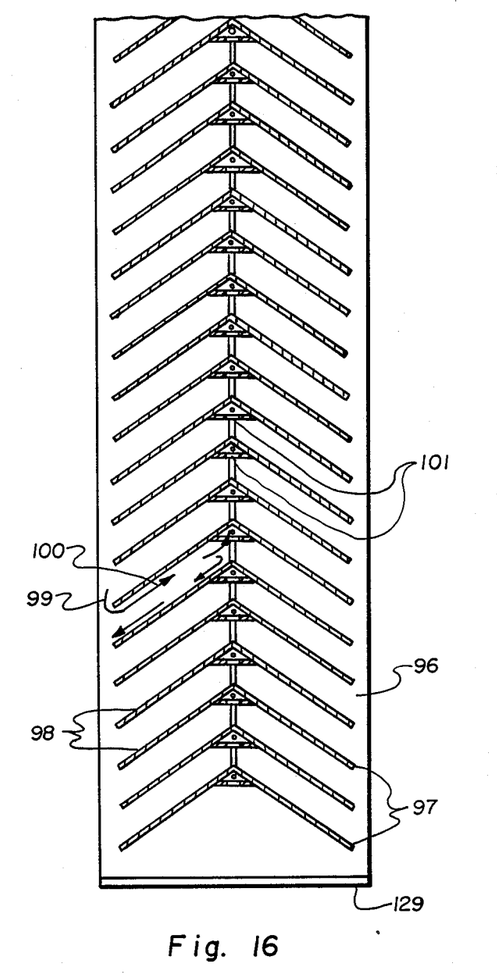
FIG. 16 is a cross-sectional view of the separator shown in FIG. 2 taken along lines 16—16.

Each of the support members 105 may be fitted with a plurality of upstanding brackets 306 which are spacedly positioned along the length of each of the innermost extensions 124. Each bracket 306 defines an aperture 308 therein which registers with a respective opening 310 defined within the structure 126. A pin 311 is inserted through the opening 310 and its respective paired aperture 308. The pin 311 may be cemented or welded in place to form a secure mounting for retaining the structure 126 in place on the support member 105.

Those skilled in the art will recognize that the embodiments hereinbefore discussed are illustrative of the general principles of the invention. The embodiments herein described are not intended to limit the scope of the claims, which themselves recite what applicant regards as his invention.

I claim:

1. A clarifier separator for use in a vessel having an inlet and an outlet for receiving a stream of mixture containing a carrier fluid and solids suspended therein, said vessel defining a flow path between said inlet and said outlet, said clarifier separator comprising:

a pair of supports positioned upright and spaced apart from each other, at least one of said supports having a plurality of generally inverted "V"-shaped recesses defined within an exterior surface and along a height of said support, each said recess including a bottom and two sidewalls, one of said supports having a pair of spacedly positioned, elongate flange-like members mounted thereon defining an elongate, open-ended channel therebetween which extends along a height of said support, said channel fitted support defining a plurality of openings therein;

a plurality of lengthwise elongate carrier chambers, each of said carrier chambers having a sidewall and two opposing open ends, said sidewall defining a hollow interior channel and at least one orifice which communicates with said hollow interior channel, each said carrier chamber having a generally inverted "V"-shaped flow-directing member, said interior channel being defined proximate an apex region of said "V"shaped flow-directing member, each said flow-directing member having wing members which extend outwardly from said interior channel, each said carrier chamber being mounted to each said support thereby extending between said supports, at least one of said ends of each chamber including an end of each of its said wing members being positioned within a respective said recess, each said support opening communicating with a said interior channel of a said carrier chamber;

a plurality of projecting tubular extensions, each of said extensions being sealedly mounted on said channel fitted support circumscribing a respective support opening and extending outwardly into said open-ended channel to form a solid walled conduit communicating with a respective support opening; and an elongate strip having a plurality of apertures therein, said strip being positioned within said open-ended channel of said support, each said aperture of said strip being positioned to register with a respective opening of said channel fitted support, wherein said tubular extensions are positioned between said strip and said channel fitted support to form a sealed solid-walled conduit between each such support opening and a respective strip aperture.

2. The clarifier separator according to claim 1 wherein both of said supports define said inverted "V"-shaped recesses within an exterior surface and along a height thereof.

3. The clarifier separator according to claim 1 wherein each of said ends of each said carrier chambers is bonded to a respective said support, each said bond including a bond of a said chamber end with a respective said recess bottom and a bond of each said first sidewall with a respective said second sidewall.

4. The clarifier separator according to claim 3 wherein each said bond is an adhesive bond.

5. The clarifier separator according to claim 3 wherein each said bond is a fusion bond.

6. The clarifier separator according to claim 1 wherein each said flange-like member biases said strip against said tubular extensions to form a mechanical pressure seal of said strip with an end of said tubular extension.

7. The clarifier separator according to claim 1 wherein said apertures are graduated in size along a height of said strip.

8. A clarifier for use in a vessel having an inlet and an outlet for receiving a stream of mixture containing a carrier fluid and solids suspended therein, said vessel defining a flow path between said inlet and said outlet, said clarifier comprising:
- a first pair of supports positioned upright and spaced apart from each other, each of said first pair of supports having at least one outwardly projecting first boss member mounted thereon;
- a second pair of supports, positioned upright above said first pair of supports, said second pair of supports being spaced from one another, each of said second pair of supports having at least one outwardly projecting second boss member mounted thereon;
- a plurality of connection strips, each connection strip having two recess wells defined therein, a first recess well receiving a first boss member, a second recess wall receiving a second boss member, said connection strips constituting means for linking said first and second pairs of supports together;
- a plurality of carrier chambers, each of said carrier chambers possessing a sidewall and two opposing ends, said sidewall defining a hollow interior channel and at least one orifice which communicates with said hollow channel, said carrier chambers being mounted on said first pair of supports to extend therebetween, said carrier chambers also being mounted on said second pair of supports to extend therebetween;
- a plurality of inverted "V"-shaped flow-directioning members, one of said flow-directioning members being placed atop each said carrier chamber;
- wherein each said first support of each pair of supports defines a plurality of openings therein, each aperture communicating with an interior channel of a carrier chamber wherein clarified fluid is received; and
- a fluid receptacle mounted on one of said supports, adapted for receiving fluid through said support openings;
- wherein an association of said carrier chambers and said supports form a vertical stacked array of settling compartments, each of said compartments being positionable in communication with said mixture flow path, said compartments being adapted to receive said mixture whereby carrier fluid is received through said chamber orifices under clarified conditions, said solids settling toward one end of said chamber sidewalls and eventually being discharged from said compartment.

9. The clarifier according to claim 8 wherein said connection strip is manually detachable from said first and second pairs of supports, said pairs of supports being thereby separable.

10. The clarifier according to claim 9 wherein each said recess well receives a respective said boss in a snap-on, snap-off relationship.

11. The clarifier according to claim 8 wherein each said connection strip defines at least one first opening therein, said first opening being in register with a second opening defined within a respective said support contiguous said connection strip, wherein a dowel is positioned within said first and second openings to constitute a mechanical linkage between said connection strip and said respective support.

12. The clarifier according to claim 11 wherein each said dowel is bonded to said respective connection strip and said respective support.

13. The clarifier separator according to claim 8 wherein a first support of each pair of supports defines a channel along a height of said first support, and wherein a single elongate strip, having a plurality of apertures therein is positioned within said channels of said first supports of said first and second pairs of supports, each said openings being positioned to register with a respective aperture in said first support.

14. The clarifier separator according to claim 13 wherein said strip is manually removable from within said channels.

15. A clarifier separator for use in a vessel, having an inlet and an outlet for receiving a stream of mixture containing a carrier fluid and solids suspended therein, said vessel defining a flow path between said inlet and said outlet, said clarifier separator comprising:
- a pair of supports positioned upright and spaced apart from each other, at least one of said supports having a plurality of generally inverted "V"-shaped recesses defined within an exterior surface and along a height of said support, each said recess including a bottom and two first sidewalls;
- a plurality of lengthwise elongate carrier chambers, each of said carrier chambers having a sidewall and two opposing open ends, said sidewall defining a hollow interior channel and at least one orifice which communicates with said hollow interior channel, each said carrier chamber having a generally inverted "V"-shaped flow directing member having wing members which extend outwardly from said interior channel, each said carrier chamber being mounted to each said support thereby extending between said supports, at least one of said ends of each chamber including said wing members being positioned within a respective said recess;

wherein a first said support defines a plurality of openings therein, each said opening communicating with a said interior channel of a said carrier chamber; and a fluid receptacle mounted on said first support adapted for receiving fluid through said openings; wherein an association of said carrier chambers and said supports form a vertical stacked array of settling compartments, each of said compartments being positionable in communication with said mixture flow path, said compartments being adapted to receive said mixture whereby carrier fluid is received through said chamber orifices under clarified conditions, said solids settling toward one end of said chamber sidewalls and eventually being discharged from said compartment.

16. The clarifier separator according to claim 15 wherein both of said supports define said inverted "V"-shaped recesses within an exterior surface and along a height thereof.

17. The clarifier separator according to claim 16 wherein each of said ends of said carrier chambers is bonded to a respective said support, each said bond including a bond of a said chamber end with a respective said recess bottom and a bond of each said sidewall with a respective said second sidewall.

18. The clarifier separator according to claim 17 wherein each said bond is an adhesive bond.

19. The clarifier separator according to claim 17 wherein each said bond is a fusion bond.

20. A clarifier separator for use in a vessel, having an inlet and an outlet for receiving a stream of mixture containing a carrier fluid and solids suspended therein, said vessel defining a flow path between said inlet and said outlet, said clarifier separator comprising:

a pair of supports positioned upright and spaced apart from each other, one of said supports defining a channel therein which extends along a height of said support, said support defining a plurality of openings therein;

a plurality of carrier chambers, each of said carrier chambers possessing a sidewall and two opposing open ends, said sidewall defining a hollow interior cavity and at least one orifice which communicates with said hollow cavity, each said carrier chamber being mounted to said supports to extend therebetween;

a plurality of inverted "V"-shaped, flow-directing members, one of said flow-directioning members being positioned atop each said carrier chamber;

a plurality of outwardly projecting extensions, each of said extensions being sealedly mounted on said channel fitted support to circumscribe a respective opening and to extend into said channel; and an elongate strip having a plurality of apertures therein, said strip being positioned within said channel of said support, said strip being slidably removable from said channel, each aperture of said strip being positioned to register with a respective opening of said support, each aperture of said strip being sealedly engaged with a respective extension to form a sealed, solid walled conduit between each said support opening and said strip aperture;

wherein an association of said carrier chambers and said supports form a vertical stacked array of settling compartments, each of said compartments being positionable in communication with said mixture flow path, said compartments being adapted to receive said mixture whereby carrier fluid is received through said chamber orifices under clarified conditions, said solids settling toward one end of said chamber sidewall and eventually discharged from said compartment.

21. A clarifier separator for use in a vessel having an inlet and an outlet for receiving a stream of mixture containing a carrier fluid and solids suspended therein, said vessel defining a flow path between said inlet and said outlet, said clarifier separator comprising:

a pair of first supports positioned upright and spaced apart from each other, each of said first supports having at least one outwardly extending projection mounted on an end thereof, said projection having a first thickness;

a pair of wing members mounted on opposing sides of said projection, to extend laterally therefrom, each of said wing members having a second thickness;

a pair of second supports positioned upright and above said first pair of supports, said second pair of supports being spaced one from another, each said second support defining a recess well configured to correspond substantially to a shape of a respective said projection, each said support defining a pair of auxiliary recess wells, said pair of auxiliary recess wells being positioned on opposing sides of said recess wells to register with said wing members, said projection being detachably received with said recess well and said associated wing members being detachably received within said auxiliary recess wells;

connection means associated with said first supports and said second supports for connecting said first supports to said second supports, a plurality of carrier chambers, each of said carrier chambers possessing a sidewall and two opposing open ends, said sidewall defining a hollow interior cavity and at least one orifice which communicates with said hollow cavity, each said carrier chamber being mounted to said supports to extend therebetween;

wherein an association of said carrier chambers and said supports form a vertical stacked array of settling compartments, each of said compartments being positionable in communication with said mixture flow path, said compartments being adapted to receive said mixture whereby carrier fluid is received through said chamber orifices under clarified conditions, said solids settling toward one end of said chamber sidewall and eventually being discharged from said compartment.

22. The clarifier separator according to claim 21 wherein said first thickness is greater dimensionally than said second thickness and said recess well has a depth substantially equivalent to said first thickness.

23. The clarifier separator according to claim 22 wherein said auxiliary recess wells have a depth substantially equivalent to said second thickness.

24. The clarifier separator according to claim 21 wherein each said wing member has a generally triangular configuration.

25. The clarifier separator according to claim 24 wherein each said wing chamber has a generally right triangular configuration, said legs of said right triangle being oriented contiguous said projection and said support.

* * * * *